United States Patent [19]

Storm

[11] 4,020,402
[45] Apr. 26, 1977

[54] AC SWITCH SPEED CONTROL FOR TWO PHASE MOTORS

[75] Inventor: John F. Storm, Minneapolis, Minn.
[73] Assignee: Honeywell Inc., Minneapolis, Minn.
[22] Filed: Sept. 19, 1975
[21] Appl. No.: 615,159
[52] U.S. Cl. .............................. 318/227; 318/231; 318/341
[51] Int. Cl.² ..................................... H02P 5/40
[58] Field of Search ............... 318/227, 231, 341

[56] References Cited
UNITED STATES PATENTS

| 3,453,515 | 7/1969 | Millois et al. | 318/341 X |
| 3,700,987 | 10/1972 | Deering | 318/341 X |
| 3,760,248 | 9/1973 | Nola et al. | 318/341 X |
| 3,835,357 | 9/1974 | Holzer | 318/341 X |

Primary Examiner—B. Dobeck
Attorney, Agent, or Firm—John S. Munday

[57] ABSTRACT

A variable burst length, switching system for controlling speed and direction of rotation of a two phase AC motor is disclosed. A bipolar DC command or error signal is supplied to a pair of pulse width modulators, one of which, depending on the DC signal polarity, produces a first pulse train of which the ratio of pulse duration to pulse repetition interval or average value is indicative of the required motor speed. The first pulse train is supplied to synchronization means which generates a second substantially identical pulse train wherein the leading and trailing edges of the pulses are timed to occur in a fixed time relationship with the energization voltage for the motor. The second pulse train comprises the input signal to current control means which is operable to energize the motor.

10 Claims, 3 Drawing Figures

AC SWITCH SPEED CONTROL FOR TWO PHASE MOTORS

BACKGROUND OF THE INVENTION

It is well known to use semiconductor switches such as silicon controlled rectifiers (SCR's), bidirectionally conductive latching switches (Triacs), or transistors connected in switching configurations to control the average AC energization of electrical loads. In the most elementary systems, the current control device (SCR, Triac, etc.) is switched to a conducting state every cycle or half cycle of energization current. The device is then returned to a nonconducting state at another point in the cycle or half cycle (typically the end of each half cycle). Variation in average load current is achieved by varying the point in the cycle at which the device is switched to a conducting (or nonconducting) state. Examples of systems operating in such a manner are disclosed in U.S. Pat. Nos. 3,065,388 and 3,159,737 issued to B.H. Pinckaers and R. A. Dora on Nov. 20, 1962 and Dec. 1, 1964 respectively.

A disadvantage of the above-described scheme is that there is typically a sharp discontinuity in the flow of current at least once each cycle resulting from the requirement that switching must be accomplished at least once each cycle at an instant when the current flow would not ordinarily be zero. Such discontinuities cause electrical noise which interferes with the operation of sensitive electrical equipment. Filter apparatus for minimizing or removing this noise adds to the complexity and cost of the system.

The noted disadvantage can be minimized, at the expense of some control current complexity, by providing for alternate conduction and nonconduction of current in bursts of varying integral numbers of half cycles. Thus, all switching occurs at zero phase angle when current flow is ordinarily zero. Current control circuits operating in this manner are also well known as evidenced by U.S. Pat. Nos. 3,319,152; 3,443,124 and 3,633,094, the first two of which issued to B. H. Pinckaers on May 9, 1967 and May 6, 1969, and the last of which issued to R. E. Clements on Apr. 15, 1970.

Either type of control circuit may be employed with or without specific provision for feedback signals indicative of the state of operation of the load. In closed loop or servoed systems, feedback signals are typically utilized to produce error signals which control the load current. Although a form of short circuit protection may be provided through use of feedback signals, such protection is generally not effective where conduction of the current control device is terminated only at the end of a half cycle of energization current.

Where the load comprises a single branch device the parameter of principal concern is position or level of operation. Load current control is limited to varying the magnitude of AC current supplied to the branch. Where the load comprises plural branches, independent control of current magnitude through each branch may be required, as is the case in the system of U.S. Pat. No. 3,204,113 issued to A. S. Snygg on Aug. 31, 1965.

In elementary systems of the latter type (e.g., a reversible drill motor control circuit), a manually operable switch may be provided between the current control device and the load whereby the current can be selectively supplied to one of a plurality of load input terminals. Such an arrangement is not suitable in a fully automatic servoed system such s may be used for positioning an aircraft control surface. Positioning motors frequently used in such an application comprise two phase, reversible, variable speed motors of a type having a feedback signal generator which produces an alternating voltage in which amplitude is indicative of motor speed and signal phase relative to an AC reference signal is indicative of direction of rotation. Accordingly, the current control circuitry for use in such a servomechanism system must be capable of utilizing the described feedback signal.

The applicant has provided a unique variable burst length, switching current control circuit for use in an aircraft servomechanism system. In line with the foregoing discussion, the control circuit is capable of utilizing a variable amplitude, two phase AC feedback signal, and is capable of providing effective instantaneous short circuit protection.

SUMMARY OF THE INVENTION

The applicant's unique AC current control circuit basically comprises input means for providing a bipolar DC command or error signal to a pulse width modulator which produces a first pulse train in which the ratio of pulse duration to pulse repetition interval or average value is representative of the required energization of an AC electrical load. The first pulse train is supplied to synchronization means which also receives an alternating reference voltage which has a fixed time relationship with the load energization voltage. The synchronization means produces a second pulse train in which pulse duration and repetition interval are substantially equal to pulse duration and repetition interval in the first pulse train, and in which the leading and trailing edges of the pulses are delayed so as to be synchronized with instants of zero reference voltage.

The second pulse train is supplied to current control means which controls the average load energization by supplying energization current to the load only during pulses in the second pulse train. Synchronization may be accomplished by means of clocked flip flop means in which the clock input signal is derived from the reference voltage. Instantaneous short circuit protection may be provided by a circuit which monitors the current through the current control means and provides a disabling signal to a clearing terminal on flip flop means if the second current is in exccess of a predetermined limit.

Accordingly, the primary object of this invention is to provide a unique method and apparatus for effecting variable burst length, switching current control for an AC electrical load.

It is a further object of this invention to provide a variable burst length, zero angle switching AC control circuitry including unique provisions for instantaneous short circuit protection.

A further object is to provide variable burst length, switching AC control circuitry for a reversible, two phase, variable speed, AC servomotor which produces a variable amplitude, two phase AC feedback signal.

Yet a further object is to provide a unique synchronized pulse width modulation circuit adapted for use in variable burst length, predetermined switching angle AC control circuitry.

Additional objects of the present invention may be ascertained from a study of the disclosure, drawings and appended claims.

DESCRIPTION OF THE PREFERRED EMBODIMENT

Figure 1A:
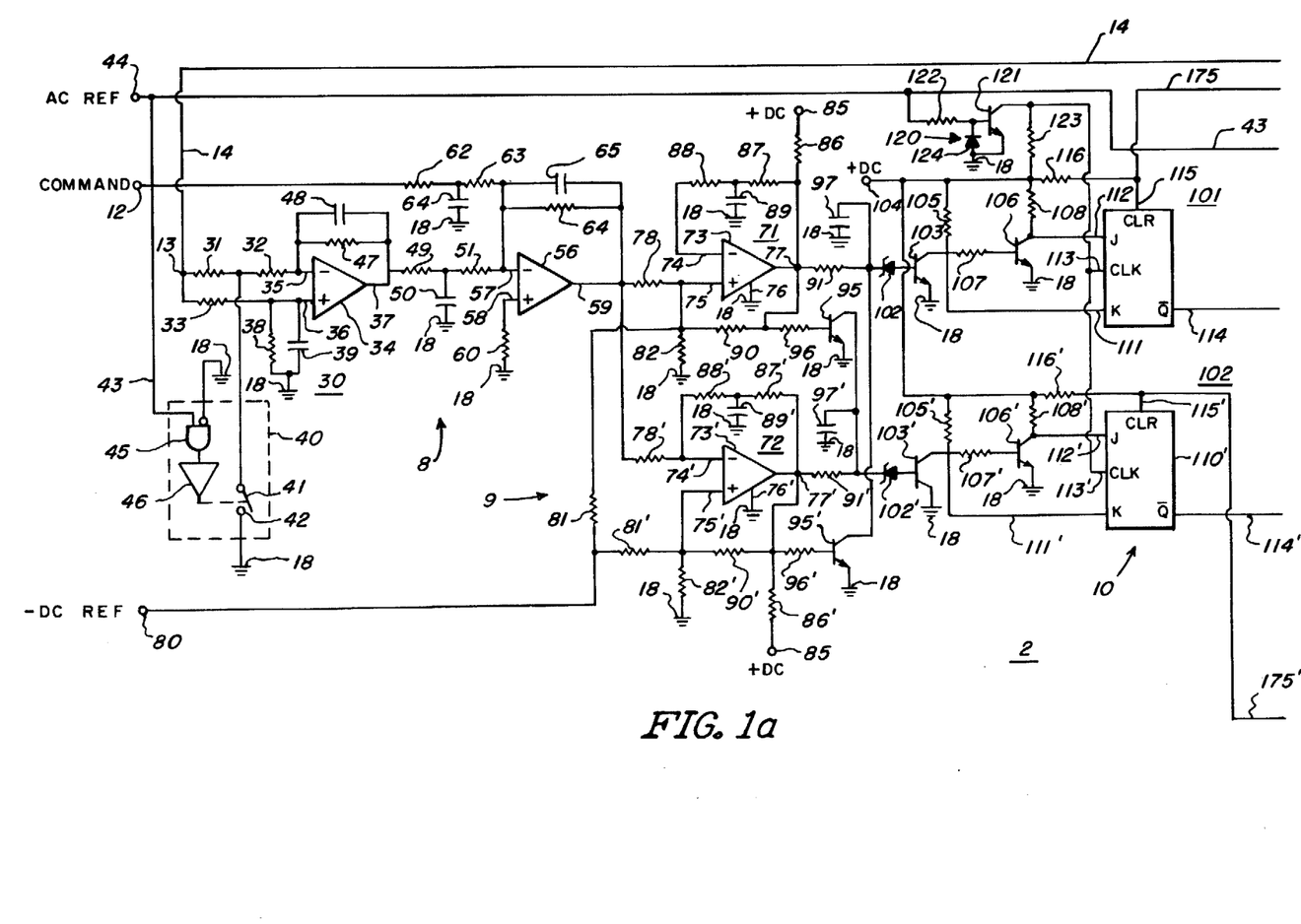
FIG. 1a and 1b is a circuit diagram of one embodiment of current control circuitry in accordance with the applicant's invention for use in an aircraft servomechanism system.
Figure 1B:
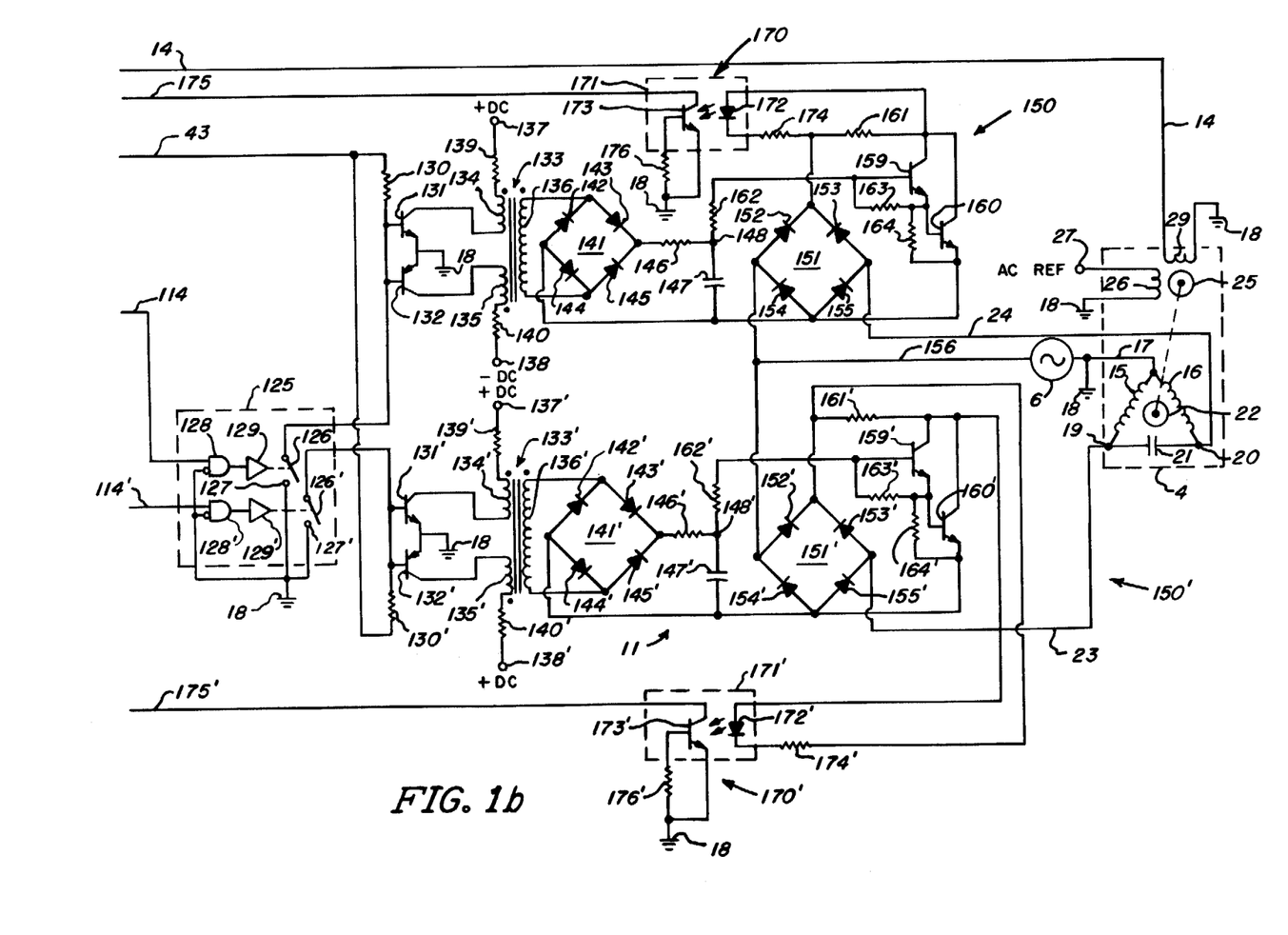

In FIG. 1, reference numeral 2 generally identifies an embodiment of the applicant's unique control circuitry as applied to controlling the average energization current supplied to an electrical load or condition altering apparatus 4 shown as a two phase AC servomotor energizable with current supplied by an alternating voltage source 6. The control circuitry broadly comprises input means, pulse width modulation means, synchronization means and current control means generally identified by reference numerals 8, 9, 10 and 11 respectively. Pulse width modulaton means 9 and synchronization means 10 are collectively referred to as control signal circuitry.

Control circuitry 2 and servomotor 4 comprise a servomechanism system for which an externally generated command signal may be supplied to an input terminal 12. A feedback signal indicative of actual operation of servomotor 4 is supplied to a junction 13 over a conductor 14. The servomechanism system responds to any imbalance between the commanded and actual operation of servomotor 4 so as to rebalance the system.

For purposes of facilitating an understanding of configuration and operation of control circuitry 2, the structure and operational characteristics of servomotor 4 will first be described. As illustrated, servomotor 4 comprises a two phase, reversible, variable speed, electric motor energizable with alternating current supplied from alternating voltage source or alternator 6. The motor has two field windings 15 and 16, each having an end connected to a common terminal of alternator 6 by means of conductor 17. Conductor 17 is maintained at a zero voltage reference potential by virtue of connection to ground 18. The other ends of windings 15 and 16 terminate in junctions 19 and 20 respectively, between which is connected a phase shifting capacitor 21. Current through windings 15 and 16 cause rotation of a rotor 22. The direction and speed of rotation respectively depend on the relative phases of current in windings 15 and 16 and the magnitude of the current.

Current may be supplied to windings 15 and 16 either through terminal 19 or terminal 20. In the former situation, phase shifting capacitor 21 is effectively connected in series with winding 16. In the later situation, phase shifting capacitor 21 is connected in series with winding 15. Energization current of variable average value is supplied to terminals 19 or 20 respectively over conductors 23 or 24 as will hereinafter be described.

Figure 2:
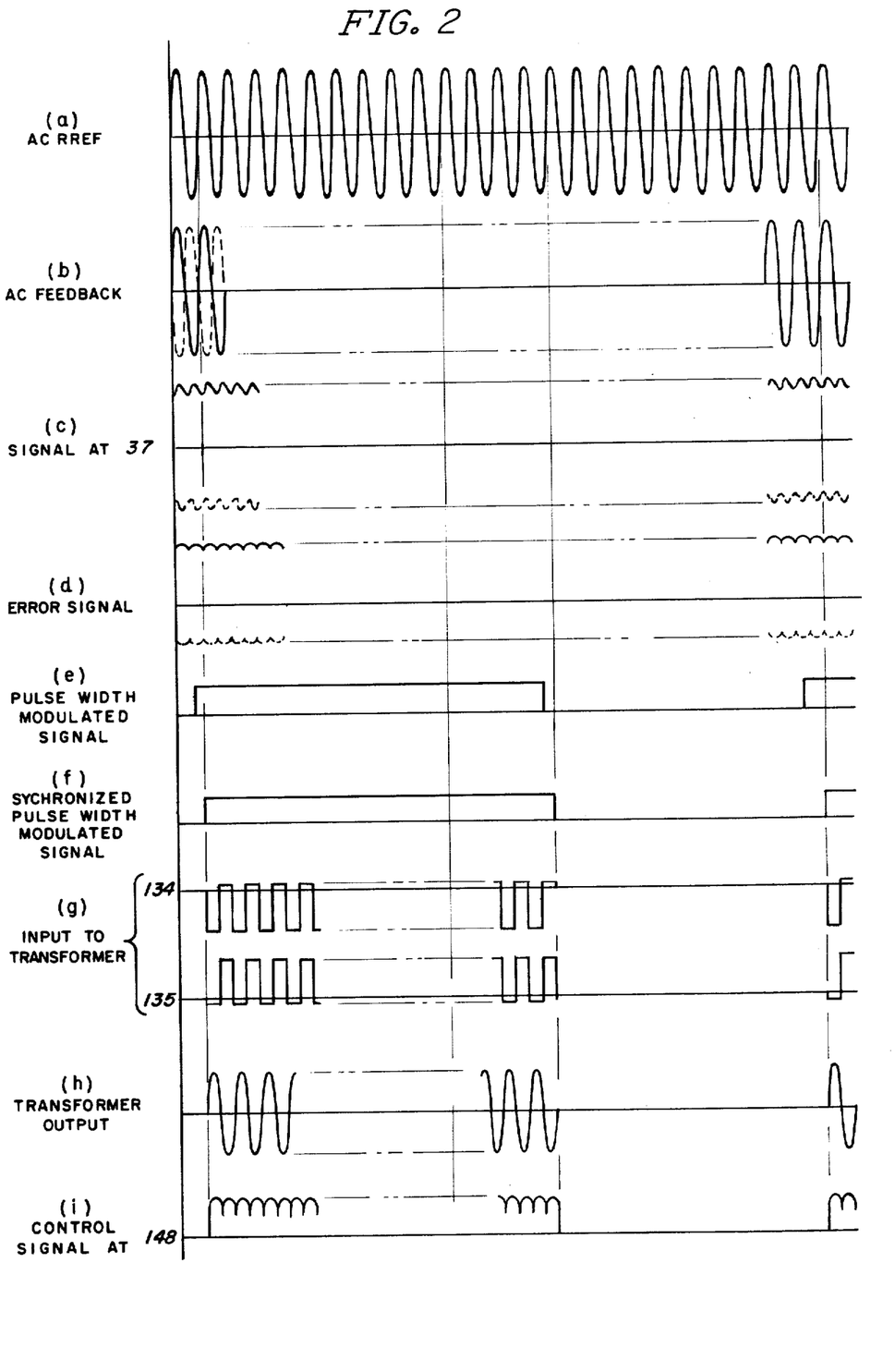
FIG. 2 comprises graphical illustrations of representative waveforms that occur at various points in the circuitry shown in FIG. 1.

Rotor 22 drives a rotor 25 of a feedback signal generator having an excitation winding 26 which is supplied with an AC reference signal through a terminal 27. The AC reference signal, which is illustrated in FIG. 2(a), is synchronized in time and phase with the voltage supplied by alternator 6. The feedback signal generator also includes a winding 29 which produces an AC signal of the same frequency as the AC reference signal, and of an amplitude dependent on the speed of rotation of rotor 25. Winding 26 is connected between conductor 14 and ground 18, thereby producing the feedback signal on conductor 14.

The AC feedback signal produced by the feedback signal generator is illustrated in FIG. 2(b). The feedback signal corresponding to the direction of rotation which results in a feedback signal in phase with the AC reference signal is shown in a solid line. The feedback signal corresponding to the opposite direction of rotation is shown dotted. Waveforms resulting from the "inphase" and "out-of-phase" feedback signals respectively, assuming no charge in polarity of the command signal, are also shown in solid and dotted lines respectively in FIG. 2(c) through 2(e).

The AC feedback signal, which is supplied to terminal 13, is effectively demodulated by a form of demodulator circuit generally identified by reference numeral 30. The AC feedback signal is supplied through series connected resistors 31 and 32 and through a resistor 33 to an operational amplifier 34 having inverting and noninverting input terminals 35 and 36 and an output terminal 37. Series connected resistors 31 and 32 are connected to inverting input terminal 35 and resistor 33 is connected to noninverting input terminal 36. Noninverting input terminal 36 is connected to ground 18 through a resistor 38 and a capacitor 39 connected in parallel.

A solid state electronic switch identified by reference numeral 40 is connected between the junction of resistors 31 and 32 and ground 18. Switch 40, which may comprise half of a DG129/A 2-channel driver manufactured by Intersil, Inc., is functionally illustrated as having a movable contact 41 connected to the junction of resistors 31 and 32, and a fixed contact 42 connected to ground 18. Contacts 41 and 42 are normally open, and are periodically closed in synchronism with an AC reference signal supplied over a conductor 43 from an AC reference signal terminal 44. This AC reference signal is synchronized in time and phase with the AC reference signal at terminal 27, and may or may not be the same signal. Periodic closure of contacts 41 and 42 is accomplished by supplying the AC reference signal to one input of a logical AND circuit 45. A second input of AND circuit 45 is connected through an inverter to ground 18. The output of AND circuit 45 is supplied to a driver 46 which determines the position of movable contact 41.

In operation, AND circuit 45 produces an output during positive half cycles of the AC reference signal. Accordingly, the junction between resistors 31 and 32 in grounded during that time, thereby preventing the AC feedback signal from reaching inverting input terminal 35. During positive half cycles of the AC reference signal half cycles of the primary AC feedback signal are supplied to noninverting input terminal 36 only. During negative half cycles of the AC reference signal the primary AC feedback signal is applied to both the inverting terminal 35 and noninverting terminal 36. Resistors 31–33 and 38 are sized to provide twice as much attenuation in the signal applied to noninverting input terminal 36 as to the signal applied to inverting input terminal 35.

Absent the filtering effect of capacitor 39 and a local feedback circuit a local feedback circuit comprising parallel connected resistor 47 and capacitor 48, the signal at output terminal 37 would be essentially a full wave rectified version of the primary AC feedback signal. Resistor 47 and capacitor 48 are sized so as to provide the required gain and ripple filtering in the output signal of amplifier 34. The net result is a filtered, full wave rectified version of the AC feedback signal, as illustrated in FIG. 2(c). The amplitude of this signal is variable depending on the amplitude of the primary AC feedback signal. The signal appearing at output terminal 37 may also be of either polarity depending on whether the primary AC feedback and AC reference signals are in phase or out of phase.

The output signal of amplifier 34 is further filtered by means of a resistor 49 and a capacitor 50 connected in series between output terminal 37 and ground 18. This signal is supplied through a resistor 51 connecting the junction between resistor 49 and capacitor 50 to the inverting input terminal of an operational amplifier 56. The inverting input terminal is identified by reference numeral 57. Amplifier 56 also has a noninverting input terminal 58 and an output terminal 59. Noninverting input terminal 58 is connected to ground 18 through a resistor 60.

Inverting input terminal 57 of amplifier 56 forms a summing point at which a DC command signal supplied at input terminal 12 is combined with the demodulated primary AC feedback signal. The command signal is supplied to inverting input terminal 57 through series connected resistors 62 and 63. A capacitor 64, which accomplishes some smoothing of the command signal, is connected between the junction of resistors 62 and 63 and ground 18.

The output signal of amplifier 56 comprises an error signal in the form of an inverted version of the sum of the command signal and the demodulated primary AC feedback signal. This error signal is further smoothed by resistor 64 and capacitor 65 connected in parallel between output terminal 59 and the noninverting terminal of amplifier 56. As indicated in FIG. 2(d), the error signal is basically a DC signal having superimposed ripple. Capacitor 65 serves to reduce the ripple. However, the capacitance of capacitor 65 must be limited so as not to introduce objectional phase shift at the control frequency. The control frequency is the frequency at which servomotor is expected to respond, and is significantly lower than the AC reference signal frequency.

The output signal of amplifier 56 is supplied to pulse width modulation means 9. Pulse width modulation means 9 comprises two pulse width modulator circuits 71 and 72, of which phase width modulator 71 responds only to positive polarity error signals, and pulse width modulator circuit 72 responds only to negative polarity error signals. Since these circuits are basically identical, the same reference numerals, primed to identify elements in modulator circuit 72, will be used to identify corresponding elements in both circuits. Similarly, the remaining portions of control circuitry 2 comprise two substantially identical portions of which corresponding elements are identified by the same basic reference numerals.

Pulse width modulator circuit 71 comprises a differential level detecting amplifier 73 having an inverting input terminal 74, a noninverting input terminal 75, a sense level control terminal 76 and an output terminal 77.

Output terminal 59 of amplifier 56 is connected to noninverting input terminal 75 of amplifier 73 through a resistor 78. Noninverting input terminal 75 is also supplied with a negative bias voltage from a precision negative DC reference source 80 through a resistor 81. A resistor 82 connected between noninverting input terminal 75 and ground 18 also comprises a portion of the bias circuitry.

Output terminal 77 is connected to a positive DC voltage source 85 through a resistor 86. Output terminal 77 is also connected to inverting input terminal 74 through series connected resistors 87 and 88. The junction between resistors 87 and 88 is connected to ground 18 through a capacitor 89.

Amplifier 73 operates such that the signal produced at output terminal 77 follows the voltage difference between the signals supplied to input terminals 74 and 75, with the condition that the voltage at output terminal 77 cannot be negative with respect to the voltage at sense level control terminal 76. As shown, sense level control terminal 76 is connected to ground 18. Therefore, the signal at output terminal 77 is limited to zero or positive values.

Pulse width modulator circuit 71 operates such that in the absence of a positive signal at output terminal 59 of amplifier 56 sufficient to overcome the negative bias on input terminal 75 of amplifier 73, the signal at output terminal 77 remains at ground or zero voltage. Once the output signal on terminal 59 becomes sufficiently positive to overcome the negative bias on input terminal 75, the voltage at output terminal 17 increases to substantially the voltage of positive DC source 85. Capacitor 89 is thus caused to charge to a positive voltage at a rate depending on the parameter values of resistor 87 and capacitor 89.

The voltage on capacitor 89 is supplied to inverting input terminal 74 through resistor 88. When sufficient voltage has accumulated on capacitor 89, and thus at inverting input terminal 74, the voltage on output terminal 77 is caused to drop to its lower limit (i.e., zero voltage or ground). Capacitor 89 then discharges through resistor 87 until the voltage difference between input terminals 74 and 75 is again sufficient to cause the output signal to rise toward the voltage of positive DC voltage source 85. Accordingly, the output signal of pulse width modulator circuit 71 is a train of pulses as illustrated in FIG. 2(e). The ratio of the pulse width to the total pulse repetition interval or average value is dependent on the magnitude of the positive error signal appearing on output terminal 59. In accordance with the foregoing operational description, it can be seen that a lower amplitude error signal decreases the ratio of the pulse duration to the pulse repetition inverval, whereas a larger amplitude error signal increases the ratio of pulse duration to pulse repetition interval.

An appropriate threshold and deadband is provided by supplying a negative bias voltage to output terminal 77 through a resistor 90. For purposes of the illustrated servomechanism system, it has been found suitable to provide a deadband such that the minimum width of a pulse produced by pulse width modulation circuit 71 is approximately equivalent in length to three cycles of the AC reference signal.

Pulse width modulation circuit 72 is identical in form to pulse width modulation circuit 71. The sole difference from the foregoing description resides in the connection between output terminal 59 of amplifier 56 and the pulse width modulation circuits. With reference to pulse width modulation circuit 72, output terminal 59 is connected to inverting input terminal 74' rather than noninverting input terminal 75. Examination of operation of modulation circuit 72 in light of the operational description provided for modulation circuit 71 reveals that circuit 72 is responsive only to error signals of negative polarity. As described with reference to modulation circuit 71, modulation circuit 72 produces a train of positive voltage output pulses wherein the ratio of pulse duration to total pulse repetition interval or average value varies in accordance with the magnitude of the negative error signal at output terminal 59.

Output terminals 77 and 77' are provided with circuitry for assuring that a pulse train is generated at only one output terminal at any given time. This circuitry comprises an NPN transistor 95 having its base connected to output terminal 77 through a resistor 96. The collector of transistor 95 is connected to output terminal 77' through resistor 91'. A capacitor 97' is connected between the collector of transistor 95 and ground. The emitter of transistor 95 is also connected to ground.

Similarly, the circuitry also comprises a transistor 95' connected to output terminal 77' through a resistor 96'. The collector of transistor 95' is connected to output terminal 77 through resistor 91. A capacitor 97 is also connected between the collector of transistor 95' and ground. The emitter of transistor 95' is connected to ground.

This circuitry operates such that a positive voltage on either output terminal 77 or output terminal 77' causes the transistor 95 (95') associated therewith to become conductive, thus preventing transmission of an output from the other pulse width modulation circuit.

The output signals of pulse width modulation means 9 are supplied to synchronization means 10. Synchronization means 10 comprises synchronization circuits 101 and 102 which are connected to receive the pulse train from pulse width modulation circuits 71 and 72 respectively. With reference to synchronization circuit 101, connection is accomplished through a Zener diode 102 oriented so that its cathode is connected to resistor 91. The anode of diode 102 is connected to the base of an NPN transistor 103 which has its collector connected to a positive DC voltage source 104 through a resistor 105, and its collector connected to ground. The collector of transistor 103 is also connected to the base of an NPN transistor 106 through a resistor 107. The collector of transistor 106 is connected to a positive DC voltage source 104 through a resistor 108. The emitter of transistor 106 is connected to ground.

The output of transistor 103, taken from its collector, is supplied to a clocked flip flop 110 through its K input 111. The output of transistor 106, taken from its collector, is supplied to clocked flip flop 110 through its J input 112. Flip flop 110 also has a clock input 113, a $\overline{Q}$ output 114 and clearing input 115.

Clock input 115 is connected to receive a clock pulse train produced by a clock pulse generator generally identified by reference numeral 120. Clock pulse generator 120 comprises an NPN transistor 121 having its base connected to AC reference signal source 44 through a resistor 122. The collector of transistor 121 is connected to positive DC source 104 through a resistor 123. The emitter of transistor 120 is connected to its base through a diode 124 having its anode connected to the emitter and its cathode connected to the base. The emitter of transistor 121 is also connected to ground.

Clock pulse generator 120 operates such that the collector of transistor 121, which is connected to supply the clock pulses to clock input 113 of flip flop 110, is normally maintained at a positive voltage. During positive half cycles of the AC reference signal transistor 121 is caused to conduct, thus lowering its collector voltage to essentially ground potential. Thus, a train of positive clock pulses synchronized with the AC reference signal is supplied to clock input 113 of flip flop 110.

Clocked flip flop 110, which may comprise a Model 5473 flip flop manufactured by Texas Instruments, Inc., operates such that the signal at its K input 111 is transferred to its $\overline{Q}$ output 114 only upon occurrence of a clock pulse at clock input 113 (provided the J and K input signals are of opposite logic phase). Accordingly, synchronization circuit 101 produces a train of pulses at output 114 wherein the ratio of pulse duration to pulse repetition interval is substantially identical to that of the pulse train produced at output terminal 77 of amplifier 73. However, the leading and trailing edges of the pulses are variably delayed to occur in a fixed time relationship with instants of zero positive going voltage of the AC reference signal. More specifically, as illustrated in FIG. 2(f), the leading and trailing edges are synchronized with instants of zero voltage. It should, however, be noted that in some cases it may be desirable to slightly alter the timing of the leading and trailing edges of pulses in the pulse train at output 114 relative to instants of zero AC reference voltage to optimize operation with loads of different power factors. This may be simply accomplished by providing an appropriate phase shift in clock pulse generator 120.

A positive voltage is required at clearing input 115 of flip flop 110 to enable operation of the flip flop. This positive voltage is normally supplied from positive DC voltage source 104 through a resistor 116. As will hereinafter be described in greater detail, means is provided for interrupting the positive voltage on clearing 115 upon occurrence of an excessive current condition at the circuit output to provide instantaneous short circuit protection.

The $\overline{Q}$ outputs 114 and 114' of flip flops 110 and 110' are connected to a solid state electronic switch generally identified by reference numeral 125. Switch 125 is similar to previously described electronic switch 40, and may comprise switch Model DG 129/A manufactured by Intersil, Inc. Switch 125 is functionally illustrated as containing two switches, each including a movable contact 126 (126') and a fixed contact 127 (127'). The switch contacts are normally open. Fixed contacts 127, 127' are connected to ground.

$\overline{Q}$ outputs 114, 114' connected to one input of logical AND circuits 128, 128' respectively. The other input of AND circuits 128, 128' are connected through inverters to ground. The outputs of AND circuits 128, 128' are respectively supplied to drivers 129, 129' which determine the positions of movable contacts 126, 126'. Switch 125 operates such that a positive voltage supplied to AND circuits 128, 128' from flip flops 110, 110' respectively result in closure of the switches having movable contacts 126, 126'. Accordingly, switches 126, 127 and 126', 127' are respectively closed during the intervals between pulses in the pulse trains produced by flip flops 110 and 110'.

Movable contact 126 of electronic switch 125 is connected to the bases of a complementary pair of transistor. These transistors comprise an NPN transistor 131 and a PNP transistor 132. The bases of transistors 131 and 132 are supplied with the AC reference signal at terminal 44 through a resistor 130. The emitters of transistor 131 and 132 are connected to ground. The collectors are connected to a pair of primary windings of a transformer generally identified by reference numeral 133, in which the primary windings are identified by reference numerals 134 and 135. Transformer 133 also includes a secondary winding identified by reference numeral 136. Windings 134–136 are situated as indicated by the dot notation. For purposes of the following description, the dots are located at a first end of first primary winding 134, a second end of second primary winding 135 and a first end of secondary winding 136.

The first end of first primary winding 134 and the second end of second primary winding 135 are connected to positive and negative DC voltage sources 137 and 138 through resistors 139 and 140 respectively. The second end of first primary winding 134 and the first end of second primary winding 135 are connected to the collectors of transistors 131 and 132 respectively. As illustrated in FIG. 2(g), transistors 131 and 132 are permitted to conduct and thus provide for current flow through primary windings 134 and 135 only during pulses in the pulse train produced by flip flop 110. In addition, it can be seen that transistors 131 and 132 are alternatively caused to conduct by means of the AC reference signal supplied through resistor 130. Accordingly, the alternate current through windings 134 and 135 alternately induces current in opposite directions through secondary winding 136. Because of the inherent filtering characteristics of transformer 133, the output across secondary winding 136 is essentially sinusoidal as illustrated in FIG. 2(h).

The output signal across secondary winding 136 is rectified by a full wave rectifier bridge 141 comprising diodes 142, 143, 144 and 145. The diodes are oriented such that the cathode of diode 142 and the anode of diode 143 are connected to the first end of secondary winding 136. The cathode of diode 144 and the anode of diode 145 are connected to the second end of secondary winding 136. The output of bridge 141 appears across a pair of terminals respectively connected to the anodes of diodes 142 and 144 and the cathodes of diodes 143 and 145.

The output of bridge 141 is slightly filtered by means of a resistor 146 and a capacitor 147 connected in series between the junctions of diodes 142, 144 and 143, 145. The slight filtering serves to prevent the voltage at junction 148 between resistor 146 and capacitor 147 from falling to zero between half cycles. The filtered signal, as taken from junction 148, is supplied to a current control device generally identified by reference numeral 150. Current control device comprises a switching transistor circuit which controls the current through servomotor 4.

A second full wave rectifier bridge 151 is provided for permitting the switching transistor circuit to control both polarities of alternating current through servomotor 4. Bridge 151 comprises diodes 152–155 of which the anode of diode 152 and the cathode of diode 154 are connected to the ungrounded terminal of alternator 6 through a conductor 156. The anode of diode 153 and the cathode of diode 155 are connected to terminal 20 of servomotor 4.

Switching transistor circuit 150 comprises a pair of NPN transistors 159 and 160 of which the collectors are connected to a junction between the cathodes of diodes 152 and 153 through a resistor 161. The base of transistor 159 is connected to junction 148 through a resistor 162, and to the base of transistor 160 through a resistor 163. The emitter of transistor 159 is also connected to the base of transistor 160. The emitter of transistor 160 is connected to a junction between the anodes of diodes 154 and 155, and to the base of transistor 160 through a resistor 164. Transistor 150, comprising transistors 159 and 160 and associated resistors, may be integrated circuit designated by number DTS 4060 manufactured by Delco Division of General Motors.

Switching transistor circuit 150 is caused to permit current to flow from alternator 6 through terminal 20 of servomotor 4 in response to a positive control signal at the base of transistor 159. The base of transistor 159 is maintained at a positive voltage during pulses in the pulse train produced by flip flop 110. Capacitor 147 prevents the voltage at terminal 148 from reaching zero between half cycles, thereby maintaining continuous conduction of transistor circuit 150 during pulses in the pulse train. Servomotor 4 is thus energized with periodic bursts of alternating current.

As noted, supplying current to terminal 20 of servomotor 4 causes rotation of rotor 22 in one direction. If rotation in the opposite direction is called for, control circuitry 2 automatically results in operation of current control device 150', thus resulting in current flow through conductor 23 to terminal 19 of servomotor 4. Accordingly, operation of servomotor 4 in either direction as required for rebalancing the servo system is automatically provided by means of unique variable burst length, zero angle switching circuitry.

The previously indicated instantaneous short circuit protection is provided through short circuit protection means generally identified by reference numeral 170. Short circuit protection means 170 comprises a current monitor 171 which may be a type TIL 103 optical coupler manufactured by Texas Instruments, Inc. Current monitor 171 is shown as comprising a light emitting diode 172 and a photo transistor 173. The cathode of diode 172 is connected in series with a resistor 174 across current sensing resistor 161 which is connected in series with current control device 150. The collector of transistor 173 is connected to clearing input 115 of flip flop 110 by means of a conductor 175. The base of transistor 173 is connected to ground through a resistor 176. The collector is connected directly to ground.

In operation, if current in excess of a limit determined by the values of resistors 161 and 174 is sensed, diode 172 illuminates the junction area in transistor 173, thus causing it to conduct and effectively connect conductor 175 to ground. This action interrupts the positive voltage at clearing input 115, thus preventing flip flop 110 from producing a pulse train, thereby maintaining current control device 150 in a nonconducting state. It may be noted that once current control device 150 becomes nonconducting, a positive voltage is again supplied to clearing input 115. However, flip flop 110 cannot produce another pulse until the AC reference signal goes through zero voltage in a positive direction. If the short circuit is still present, short circuit protection means 170 again results in cutoff of current control device 150 at the point in the cycle at which current exceeds the predetermined limit. Thus, excessive current is never permitted through the load or current control device.

Although an embodiment of the applicant's unique variable burst length, zero angle switching, AC control circuit has been shown and described for illustrative purposes, other embodiments which do not depart from the applicant's contemplation and teaching will be apparent to those skilled in the art. The applicant does not intend that coverage be limited to the disclosed embodiment, but only by terms of the appended claims.

What is claimed is:

1. In a servomechanism system including condition altering apparatus energizable with current supplied by an alternating voltage source, means for producing a feedback signal indicative of operation of the apparatus, and input means for combining the feedback signal with a command signal indicative of desired operation of the apparatus to produce an error signal, improved circuitry for controlling the average energization current supplied to the apparatus, comprising:

pulse width modulation means connected to receive the error signal and operable to produce a first pulse train in which the ratio of pulse duration to pulse repetition interval varies in accordance with the error signal;

synchronization means connected to receive the first pulse train and operable to produce a second pulse train in which pulse duration and repetition interval are substantially equal to pulse duration and repetition interval in the first pulse train, and in which the leading and trailing edges of the pulses are variably delayed to occur in a fixed time relationship with instants of zero energization voltage; and current control means connected to receive the second pulse train and operable to supply energization current to the condition altering apparatus only during pulses of the second pulse train, whereby the apparatus is supplied with periodic bursts of alternating energization current beginning and ending in a fixed time relationship with instants of zero energization voltage, the average value of energization current depending on the error signal.

2. The servomechanism system of claim 1 wherein said synchronization means comprises:

clocked flip flop means having signal pulse and clock pulse input terminals and an output terminal, said clocked flip flop means being operable to produce an output signal which changes state in response to a change in input signal state only upon receipt of a clock pulse;

means for supplying the first pulse train to the signal pulse input terminal;

a clock pulse source for producing a train of clock pulses having a fixed time relationship with the voltage supplied by the alternating voltage source; and means connecting the clock pulse source to the clock pulse input terminal of said clocked flip flop means.

3. The servomechanism system of claim 2 including short circuit protection means comprising:

a clearing terminal on said clocked flip flop means, said clocked flip flop means being operable to produce an output signal which results in energization of the condition altering apparatus only when an enabling signal is supplied to said clearing terminal;

enabling means for normally supplying an enabling signal to said clearing terminal; and current monitoring means associated with said current control means and said enabling means, said current monitoring means being operable to interrupt the enabling signal when current in excess of a predetermined limit through said current control means is sensed.

4. The servomechanism system of claim 2 wherein:

the train of clock pulses is synchronized with the voltage supplied by the alternating voltage source; and said clocked flip flop means is operable to produce an output signal which changes state in response to changes in input signal state only upon occurrence of the rising edge of a clock pulse, whereby the leading and trailing edges of pulses in the second pulse train are timed to coincide with instants of zero, positive going energization voltage.

5. The servomechanism system of claim 1 wherein:

the condition altering apparatus is a reversible, variable speed electric motor having a first terminal to which energization current is supplied to cause operation in a first direction and a second terminal to which energization current is supplied to cause operation in a second direction;

the error signal has a bipolar DC component of which the polarity and magnitude are respectively indicative of required direction and speed of motor operation;

said pulse width modulation means comprises first and second pulse width modulators which respectively respond only to error signals in which the DC components are of different polarities;

said synchronization means comprises first and second synchronization circuits connected to receive the first pulse trains from said first and second pulse width modulators respectively; and said current control means comprises first and second control channels connecting said first and second synchronization circuits to the first and second terminals respectively of said electric motor.

6. The servomechanism system of claim 5 wherein said first and second control channels each include signal isolation means comprising:

a transformer having first and second primary windings and a secondary winding, each winding having first and second terminals, said windings being situated so that application of a voltage of a given polarity between the first and second terminals of the first primary winding induces a voltage of the same polarity between the the first and second terminals of the secondary winding, and application of a voltage of the given polarity between the first and second terminals of the second primary winding induces a voltage of the opposite polarity between the first and second terminals of the secondary winding;

first and second complementary transistors of which the emitters are connected to a zero voltage reference potential source, the bases are normally supplied with an alternating voltage synchronized with the voltage supplied by the alternating voltage source, and the collectors are connected to the second terminal of the first primary winding and the first terminal of the second primary winding respectively;

means for electrically connecting the bases of the first and second transistors to the zero voltage reference potential source during the intervals between pulses in the second pulse train;

electronic switch means for connecting the alternating voltage source to the electric motor, said electronic switch means being operable to permit current flow to the motor only when receiving a control signal at a control terminal; and means connecting the secondary winding of said transformer to the control terminal of said electronic switch means, whereby a control signal is supplied to the control terminal only during pulses in the second pulse train.

7. In a servomechanism system wherein a variable speed electric motor is energizable with current supplied by a fixed frequency alternating voltage source, the motor including means for producing a feedback signal indicative of motor speed, improved speed control circuitry for varying the average energization current by supplying energization current only during intervals of variable duration, comprising:

input means for combining a command signal indicative of desired motor speed and the feedback signal to produce an error signal;

a pulse width modulation means connected to receive the error signal and operable to produce a first pulse train in which the ratio of pulse duration to pulse repetition interval varies in accordance with the error signal;

a clock pulse source for producing a train of clock pulses synchronized with the fixed frequency alternating voltage;

clocked flip flop means having signal pulse input means, a clock pulse input terminal connected to receive the train of clock pulses and an output terminal, said clocked flip flop means being operable to produce an output signal which changes state in response to changes in input signal state only when triggered by a clock pulse;

means connecting said pulse width modulation means to the signal pulse input means of said clocked flip flop means, whereby said clocked flip flop means produces an output signal comprising a second pulse train in which pulse duration and repetition interval are substantially equal to pulse duration and repetition interval in the first pulse train, and in which the leading and trailing edges of the pulses are synchronized with instants of zero energization voltage;

electronic switch means for connecting the voltage source to the electric motor, said electronic switch means being operable to permit current flow to the motor only when receiving a control signal at a control terminal; and control signal means connecting the output terminal of said clocked flip flop means to the control terminal of said electronic switch means so that a control signal is supplied to the control terminal only during pulses in the second pulse train.

8. The servomechanism system of claim 7 including short circuit protection means comprising:

a clearing terminal on said clocked flip flop means, said clocked flip flop means being operable to produce an output signal which results in energization of the electric motor only when an enabling signal is supplied to said clearing terminal;

means connected to said clearing terminal for normally supplying an enabling signal; and current monitoring means associated with said electronic switch means and said enabling means, said current monitoring means being operable to interrupt the enabling signal upon sensing current in excess of a predetermined level through said electronic switch means.

9. The servomechanism system of claim 7 wherein:

the electric motor is reversible and has a first terminal to which energization current is supplied to cause rotation in a first direction, and a second terminal to which energization current is supplied to cause rotation in a second direction;

the feedback signal is a variable amplitude alternating voltage signal of the same phase as the energization voltage when the motor operates in the first direction, and 180° out of phase with the energization voltage when the motor operates in the second direction;

the command signal is a bipolar DC signal;

said input means comprises a demodulator for converting the feedback signal into a substantially bipolar DC feedback signal and summing means for combining the command and bipolar DC feedback signals, whereby the error signal has a bipolar DC component of which the polarity and magnitude are respectively indicative of required direction of motor operation and motor speed;

said pulse width modulation means comprises first and second pulse width modulators which respectively respond only to error signals in which the DC components are of different polarities;

said clocked flip flop means comprises first and second clocked flip flop circuits connected to receive the first pulse trains from said first and second pulse width modulators respectively;

said electronic switch means comprises first and second electronic switch circuits for connecting the alternating voltage source to the first and second terminals respectively of said electric motor; and said control signal means comprises first and second control signal channels for connecting the output terminals of said first and second clocked flip flop circuits to the control terminals of said first and second electronic switch circuits respectively.

10. The servomechanism system of claim 9 wherein said first and second control signal channels each include signal isolation means comprising:

a transformer having first and second primary windings and a secondary winding, each winding having first and second terminals, said windings being situated so that application of a voltage of a given polarity between the first and second terminals of the first primary winding induces a voltage of the same polarity between the first and second terminals of the secondary winding, and application of a voltage of the given polarity between the first and second terminals of the second primary winding induces a voltage of the opposite polarity between the first and second terminals of the secondary winding;

first and secondary complementary transistors of which the emitters are connected to a zero voltage reference potential source, the bases are normally supplied with an alternating voltage synchronized with the energization voltage, and the collectors are respectively connected to the second terminal of the first primary winding and the first terminal of the second primary winding;

means for electrically connecting the bases of the first and second transistors to the zero voltage reference potential source during the intervals between pulses in the second pulse train; and means connecting the secondary winding of said transformer to the control terminal of said electronic switch circuit.

* * * * *